Nov. 29, 1955   R. E. KESEL ET AL   2,725,004
INTERLOCK FOR ROLL-HOLDING CAMERAS
OF EXTRUSION-LOADING TYPE
Filed April 4, 1951   3 Sheets-Sheet 2

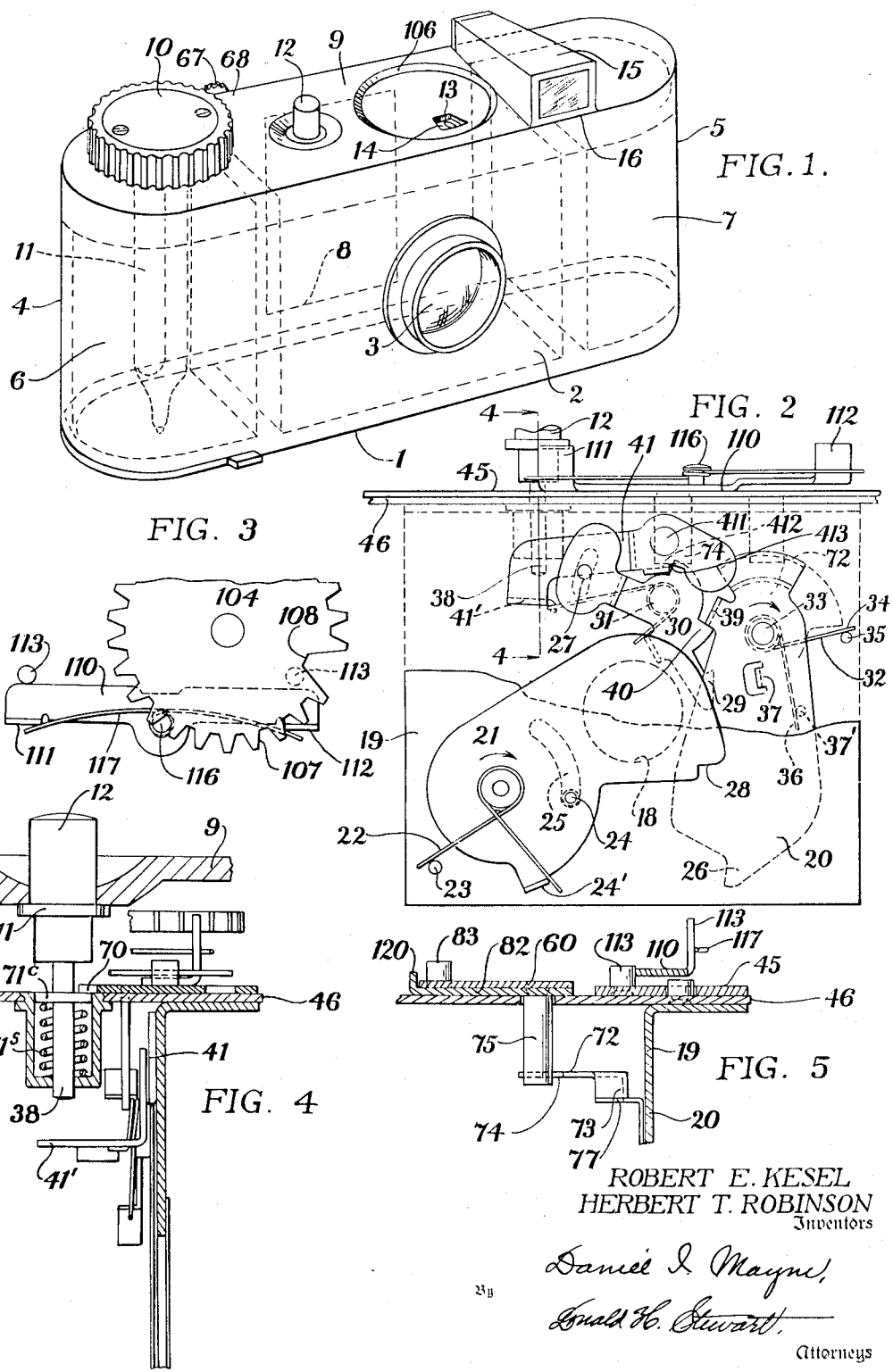

ROBERT E. KESEL
HERBERT T. ROBINSON
Inventors

By Daniel I. Mayne,
Donald H. Stewart
Attorneys

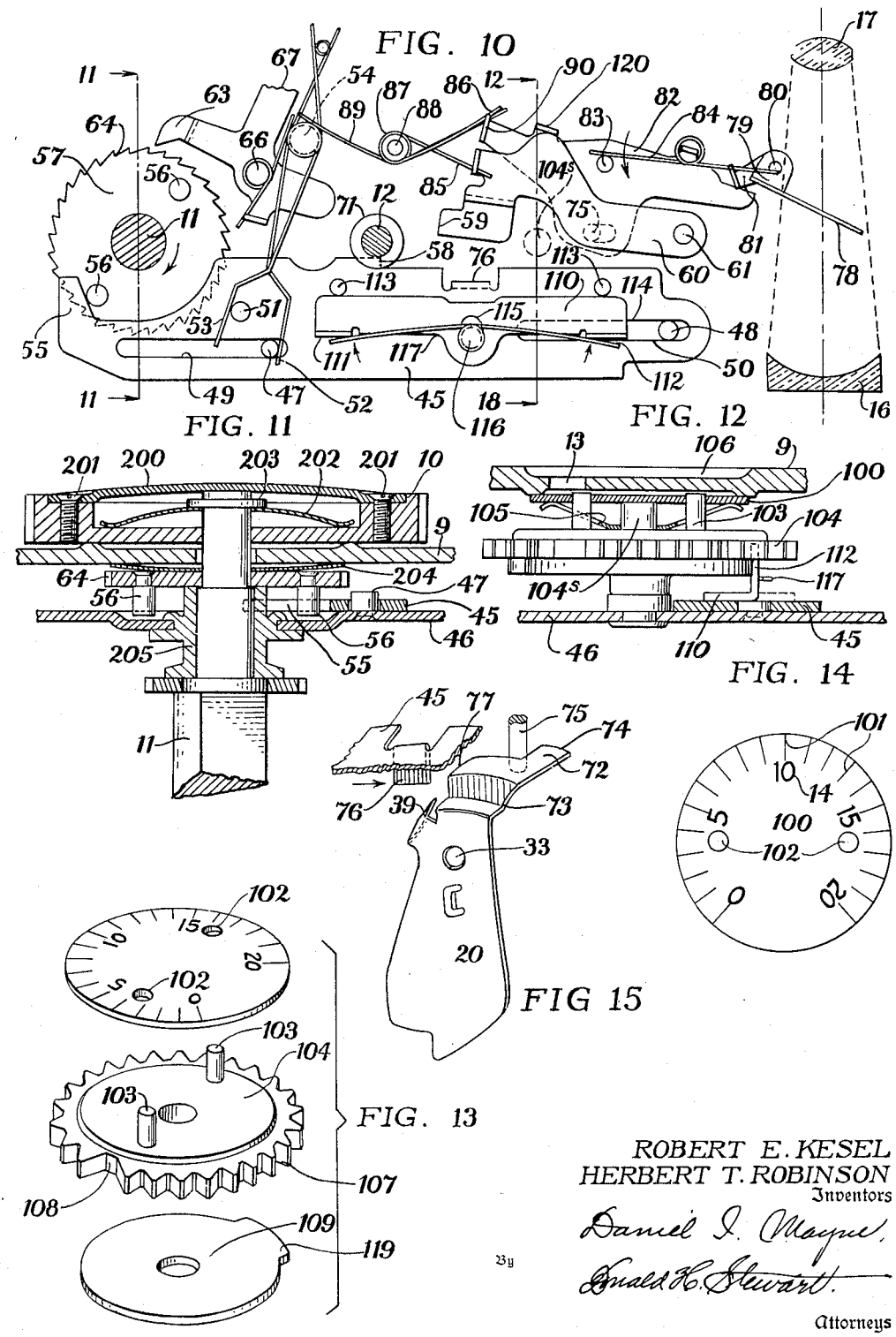

United States Patent Office 2,725,004
Patented Nov. 29, 1955

2,725,004

INTERLOCK FOR ROLL-HOLDING CAMERAS OF EXTRUSION-LOADING TYPE

Robert E. Kesel and Herbert T. Robinson, Rochester, N. Y., assignors to Eastman Kodak Company, Rochester, N. Y., a corporation of New Jersey Application April 4, 1951, Serial No. 219,212

9 Claims. (Cl. 95—31)

This invention relates to roll-film cameras, and more particularly to a camera interlocking mechanism for controlling the relative operation of a film-winding mechanism and a shutter trigger. One object of our invention is to provide a mechanism suitable for any roll-film camera, but particularly suitable for a roll-film camera of the so-called "extrusion-loading" type. That is, a camera of the type in which film is placed on a spool-winding shaft from which it is extruded into a loose coil in a spool chamber, after which it is wound back on the original spool intermittently making exposures as the film is rewound. Another object of our invention is to provide a mechanism of the class described in which the liability of improperly operating the camera mechanism or making double exposures is reduced to a minimum. Still another object of our invention is to provide an interlock between a film-winding mechanism, a shutter-setting mechanism and a shutter trigger which will render the camera substantially foolproof. Other objects will appear from the following specification, the novel features being particularly pointed out in the claims at the end thereof.

In interlocking mechanisms for controlling the relative operation of a film-winding mechanism, a shutter-setting mechanism and a shutter trigger, and particularly in such mechanisms as applied to extrusion-loading cameras, a number of difficulties are ordinarily encountered. With extrusion-loading cameras, the film is wound on a flange spool, the spool flanges in turn having inwardly-extending rims or beads around the edges of the film so that the film must be bowed in passing between the flanges. The contact between the film and these beads is partially relied upon, at least to cause the film to be extruded and, consequently, there may be some lost motion between the film and the spool from which it is extruded. Thus, with cameras of the extrusion-loading type, any automatic winding mechanism should allow for some lost motion between the film and the winding key in properly positioning the first area for exposure, and the film metering mechanism should also provide for both the leader and the tail strips to be wound in moving the film to and from the film spool.

Our present mechanism is particularly designed to advance film equal to an exposure area plus suitable spacing between exposures. The film metering control which is the subject of our copending application Serial No. 219,211, filed April 4, 1951, Two-Way Film Metering Device, now Patent 2,629,563, granted February 24, 1953, deals in detail with the structure of the counter mechanism which is also shown in the present application in its proper relationship to the interlocking mechanism. We also have a copending application Serial No. 197,220 for Camera Shutter With Two Successively Operated Blades, filed November 24, 1950, now Patent 2,621,570, granted December 16, 1952, showing specific details of the shutter used herein.

Coming now to the drawings wherein like reference characters denote like parts throughout, Fig. 1 is a perspective view of a typical camera which may be constructed in accordance with, and may embody, a preferred form of our invention;

Fig. 2 is an enlarged front elevation of a portion of the camera mechanism removed from the camera and showing the camera shutter and associated parts;

Fig. 3 is an enlarged fragmentary top plan view of a portion of the film-metering mechanism and its actuating pawl;

Fig. 4 is a fragmentary part-section, part-elevation taken on line 4—4 of Fig. 2;

Fig. 5 is a fragmentary detail section taken on line 5—5 of Fig. 6;

Fig. 10 is a view similar to Fig. 6 but with the interlocking mechanism in a position through which the parts pass during the film-extruding operation;

Fig. 11 is a fragmentary detail section taken on line 11—11 of Fig. 10 and showing, in addition, the winding knob;

Fig. 12 is a fragmentary section taken through the counter dial and metering mechanism on line 12—12 of Fig. 10;

Fig. 13 is an exploded view showing the film counting dial, the metering ratchet and the ratchet cam;

Fig. 14 is a top plan view of a counter dial;

Fig. 15 is a fragmentary detail perspective view of a part of the shutter mechanism and the shutter setting and the slide stop releasing device.

Figure 6:
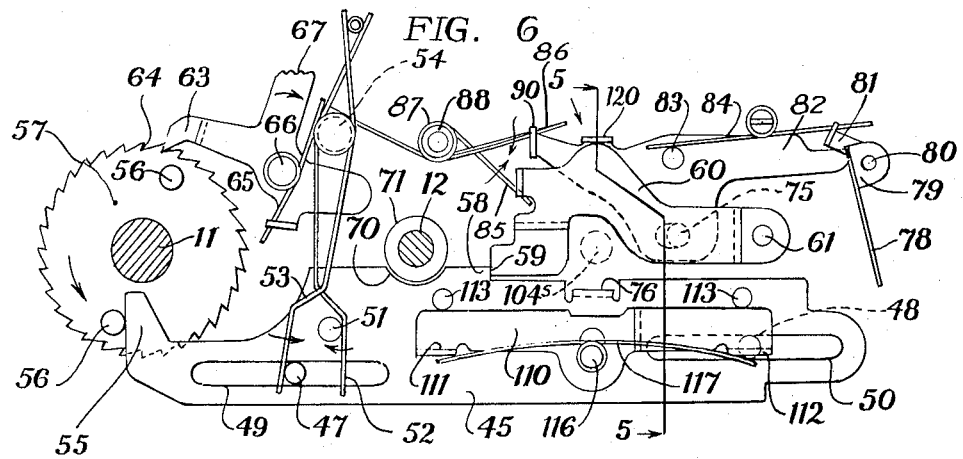
Fig. 6 is a fragmentary top plan view of the interlock mechanism showing the relationship of associated parts with parts being omitted for clearness. In this view, the camera has had the film wound and the parts are ready for an exposure to be made.
Figure 7:
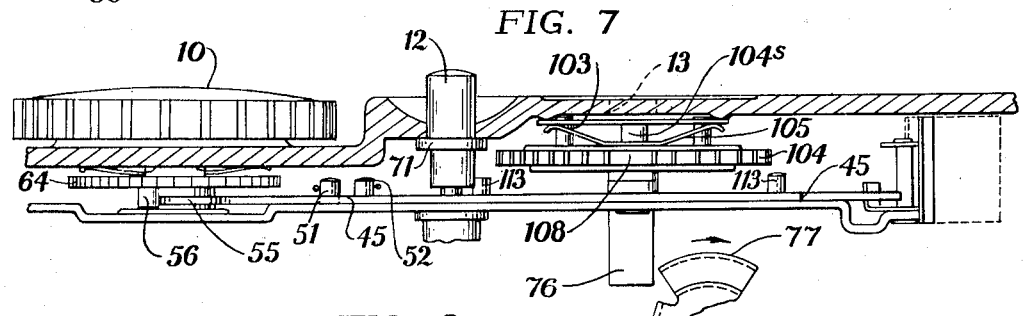
Fig. 7 is a side elevation, partly in section, through a portion of the mechanism shown in Fig. 6.

Our invention comprises broadly an interlock between a winding mechanism for moving film in an unwinding and a winding up direction, a mechanism for spacing film during the rewinding movement for exposures, these interlocking elements cooperating with a shutter trigger to permit operation of the trigger only when film is properly positioned for exposure. Our mechanism may operate a signal in the finder to indicate the position of the interlocking parts.

As indicated in Fig. 1, a typical camera may consist of a camera body 1 having a front wall 2 supporting an objective 3. The camera may have curved end walls 4 and 5, the former enclosing a portion of a film spool receiving chamber 6, and the latter enclosing a portion of a film chamber 7 into which film may be extruded. These two film chambers lie on opposite sides of an exposure frame 8 across which film lies during an exposure.

A top wall 9 of the camera may support a film winding knob 10 passing down through the top wall and turning a film spool shaft 11 which supports film to be exposed. The winding knob 10, Fig. 11, may include a cover 200 held on by screws 201. Underneath the cover 200 there is a spring washer 202 to frictionally engage a collar 203 on the film-winding shaft 11. There may also be a spring washer 204 pressing down on ratchet 57 from which the posts 56 extend downwardly into the path of an arm 55 on slide 45 as will be hereinafter described. A bearing 205 in mechanism plate 46 revolubly supports the winding key shaft 11. The winding knob 10, the shaft 11 and ratchet wheel 57 all turn together and may be referred to broadly as the winding knob. The shaft 11 is polygonal in cross section, here triangular, to drivingly engage a complementary configuration in a film spool, all as is well known.

A trigger 12 may also be mounted on the top wall 9 of the camera, and preferably this wall carries a window 13 through which a numeral 14 on an exposure counter may be viewed. There is a view finder 15, preferably having a negative lens 16 in the front and a positive lens 17 in the rear, as shown in Fig. 10.

Referring to Fig. 2, the camera may have a shutter of the same general type as shown in our application Serial No. 197,220, filed November 24, 1950 above referred to, in that an exposure aperture 18 in a front mechanism plate 19 may permit light to pass for an exposure when a cover blind 20 and a shutter blade 21 are moved in the following manner.

The shutter blade 21 normally lies over the exposure aperture 18, and it may be operated by a spring 22 resting against a pin 23 and a lug 24' on the shutter blade, thereby tending to hold a pin 24 in the end of a slot 25. This pin 24 may be engaged by a lug 26 on the cover blind 20 so that when this blind is moved in the direction shown by the arrow, lug 26 will strike and move the pin 24 and rotate the shutter blade 21 into a position in which the spring 22 is set and the shutter blade 21 is latched by means of a latch element 27 engaging a latch element 28 on the shutter blade. At the same time, a second latch element 29 carried by lever 30, pivoted at 31, will engage a lug 37 on the cover blind. In the set position, the spring 32 encircling the cover blind shaft 33 and having one end 34 engaging a pin 35 while the other end 36 engages a pin 37' on the cover blind will be wound up and tensioned and the parts will be ready for an exposure.

The shutter release 12 may operate a downwardly-extending plunger 38 to rock the release lever 41 and with it lever 30. As lever 41 rocks about its pivot 411, lug 412 carried by lever 41 may engage and turn shoulder 413, moving lever 30 to release latch element 29 from 37 so that the cover blind 20 may turn under the impulse of its spring 32 until a lug 39 strikes and moves a shoulder 40 carried by the lever 30, at which time further movement of lever 30 will take place so that latch element 27 may release latch element 28. By disengaging latch element 27 from the trigger latch element 28, the shutter blade 21 will rapidly close the aperture 18 after it has been uncovered by the cover blind 20. Quick opening and closing movements are obtained. As thus far described, the shutter mechanism is quite similar to that shown in the above-mentioned patent.

The method of setting the shutter and the interlocking mechanism which will now be described, however, is new with this application.

We provide a slide 45 mounted to move on a mechanism plate 46 as shown in Figs. 4, 5, 6 and 12. The mechanism plate may support upstanding pins 47 and 48 which may pass through slots 49 and 50 in the slide 45 to control the extent of the movement of this slide. The slide may be provided with a pin 51 against which a spring 52 may press, according to its position, this spring being somewhat heavier than a second spring 53 which may press on the upstanding pin 47 according to the position of the slide. The tendency of these two springs is to hold the pin 51 with the slide 45 in a position in which the pins 47, 51 and a stud 54 are all in substantial alignment. However, this position is never reached while the slide is at rest. When the film has been wound and the parts are in a position for exposure, as indicated in Fig. 6, it will be noticed that an arm 55 on the end of the slide lies in the path of the two pins 56 carried by the ratchet 57. Thus, the ratchet wheel cannot be turned in the direction shown by the arrow because the slide 45 is held against movement by a shoulder 58 which lies in engagement with a pivoted stop 59, which may consist of a lever 60 pivoted at 61 to the mechanism plate.

Therefore, if an effort be made to turn the winding knob 10 to wind film, this could not be done when in the Fig. 6 position.

If an effort should be made to turn the winding knob 10 in a reverse direction, this also could not be done because of the pawl 63 pressed into engagement with the ratchet teeth 64 by means of a suitable spring 65. This pawl may turn about its pivot 66 and is provided with a handle 67 extending through a rear wall of the camera 68, Fig. 1, and into an operative position so that in extruding the film this pawl may be moved in the direction shown by the arrow, Fig. 6, to the position shown in Fig. 10, wherein the knob 10 may be turned to move film from chamber 6 to chamber 7. As above pointed out, Fig. 6 shows the parts ready for an exposure. The film cannot be wound. An operator may then press the trigger 12. This can be done because there is a curved notch 70 which lies in a position to permit a flange 71 to pass the slide 45 and, as the trigger 12 is depressed, the plunger 38, Fig. 2, will release the shutter as pointed out above. A spring 71$^s$, Fig. 4, pressing on collar 71$^c$, holds the trigger raised, but when the trigger 12 is depressed, plunger 38 strikes a flange 41' on lever 41.

When this releasing movement takes place, a pivoted shutter arm 72, carried by an upper flange 73 of the cover blind 20, moves an arm 74, Fig. 5 and Fig. 15, against a downwardly-extending post 75, carried by lever 82 and above which is the latch arm 60 as shown in Figs. 5 and 6. This arm 74, therefore, moves the post 75 about the pivot 83 in a clockwise direction with respect to Fig. 5 or toward the left of the drawing with respect to Fig. 6, allowing spring 87 to move and releasing the latching lug 59 from the slide shoulder 58 as hereinafter described. When released, the slide may be moved when film is wound because pin 56 may move the shoulder 55 to the right with respect to Fig. 6, the continued movement causing the parts to reach the Fig. 8 position, in which position the shutter has been wound by means of the downwardly-extending lug 76, carried by slide 45, striking the curved flange 77 of the cover blind 20 and moving it until the shutter is set.

Figure 8:
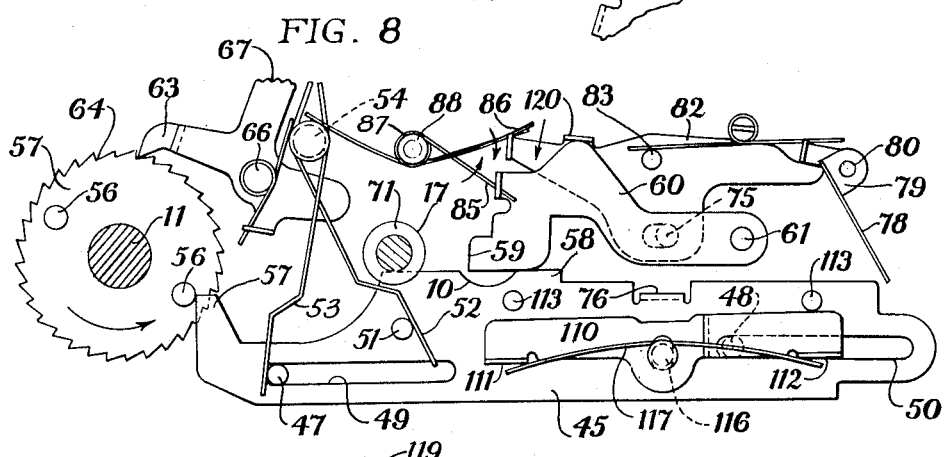
Fig. 8 is a view similar to Fig. 6, but with the parts in the position to which they may have been moved in winding the shutter, but with the film winding only partially completed.
Figure 9:
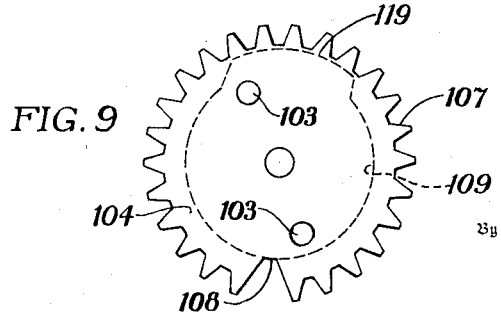
Fig. 9 is a top plan of a metering ratchet and its associated cam.

Fig. 8 shows the position of the parts when the shutter is set, but movement of the winding knob 10 continues and pin 56 will, therefore, slip off arm 57 of the slide 45, at which time the less powerful spring 52, pressing on pin 51, will move the slide to the left, or almost as far as shown in Fig. 10, and toward a position in which the pins 47, 51 and the stud 54 will lie in a straight line. It will be noticed that as soon as the slide 45 moves from its Fig. 6 position, it prevents the trigger 12 from being operated because a portion of the slide will lie beneath the flange 71 and, consequently, will not permit downward vertical movement of the trigger a sufficient distance to make an exposure. When the slide 45 moves under the impulse of spring 52, it will move so that the curved notch 70 lies to the left with respect to the Fig. 10 position of the trigger 12, and the trigger cannot be operated until the movement of the slide in a reverse direction occurs through contact of a pin 56 with the arm 55. On this second movement of the slide to the right with respect to Fig. 6, the shoulder 58 is again engaged by the stop element 59 so that not only is the slide 45 halted, but the movement of the winding key 10 is halted and the parts are again in a position for exposure.

We prefer to provide a signal in the finder 15 to indicate to an operator when the camera is in condition for exposure. As indicated in Fig. 10, the finder may consist of a front finder element 16 and a rear element 17 and in between there is a hinged signal 78. This signal is preferably a colored filter, such as a red filter, and it consists of a sheet of material pivotally mounted at 79 to a stud 80, there being an arm 81 extending outwardly and into the path of a lever 82 pivoted at 83 to the mechanism plate. A spring 84 tends to turn this lever in the direction shown by the arrow in Fig. 10 to rotate the signal 78 from its operative position shown in Fig. 10 to an inoperative position as shown, for instance, in Figs. 6 and 8. Lever 82 carries the downwardly-extending pin 75 which is used to coact with the cover blind 20 so that when an arm 74 on the cover blind lies in its normal rest position, as shown in Figs. 2 and 15, it will contact the pin 75 swinging a lever 82 in a clockwise direction towards the position shown in Fig. 10. In this position the latch element 59 has been removed from the latch element 58 carried by the slide 45. The slide is not latched and in Fig. 10 this is because the parts are in a film-extruding position. The position of the signal 78, of course, would indicate by a red glare in the finder that a picture should not be attempted.

The levers 60 and 82 are pressed toward each other by means of spring 87 encircling a stud 88 and having arms 85 and 86 so that these levers tend to remain in the relationship shown or pressed together as in Fig. 10. A second spring 89, resting on the stud 54 at one end and against a lug 90 on the lever 82 at the other end, tends to swing both levers in a counterclockwise direction about their pivots so that the latch element 59 will be contacted with the slide 45. However, this movement is opposed by the pin 75, and the cover blade in the Fig. 15 position will hold the pin so that both levers 60 and 82 lie out of contact with the slide 45.

While this signal is not essential, it is very useful so that an operator can tell in what position the various interlocking parts lie, particularly after the camera has not been used for some time.

We provide a counting mechanism which is unique in that this counter must work in two different directions in order to function properly—that is, on one direction while the film is being extruded, and in a second direction when the film is being moved in a reverse direction while exposures are being made. Referring to Figs. 12 to 14 of the drawings, the counter may consist of a counter disk 100, as shown in Fig. 14, bearing the scale 101 graduated into the desired number of units indicating exposures and numerals 14 at intervals if desired. This disk is perforated at 102 so that a pair of spaced pins, as shown in Fig. 13, may pass through these perforations to turn the disk with the two-way ratchet wheel 104. The pins 103 extend upwardly from the ratchet through the apertures 102, as shown in Fig. 12, and a spring washer 105 preferably creates the desired friction between the counter disk 100 and the recessed wall 106 of the camera. The two-way ratchet 104 is provided with teeth or serrations 107 spaced equally apart, and at one area there is a recess 108 of greater depth and width than the teeth 107. Below the ratchet 104 there is a cam 109 which may be integral with or which may be formed by a separate piece attached to the two-way ratchet 104.

In order to actuate this ratchet, there is a double-ended pawl 110, best shown in Fig. 10. This pawl has upstanding ends 111 and 112 and it is pressed against a pair of spaced pins 113 and 114 on the slide 45. Since the double-ended pawl 110 is slotted at 115 to receive a stud 116, it may normally lie against the pins 113 and 114 because of the pressure of a spring 117 which encircles the stud 116 and which has ends pressing the flanges 111 and 112 in the direction shown by the arrows in Fig. 10.

Each time the slide 45 moves, a pawl—that is, either the upstanding flange 111 or the upstanding flange 112, may engage a ratchet tooth 107. Referring to Fig. 3, the ratchet is operating to turn the disk 100 one step at a time in a clockwise direction. Here a pawl member 112 is shown engaging a tooth 107 and, as the slide 45 moves to the left with reference to Fig. 10, the double-ended pawl 110 may be moved away from one of the pins 113, so that the tooth 107 engaging the middle of the pawl 112 may move the pawl from the tooth at each back-and-forth movement of the slide 45. When the pawl 112 reaches the cut-out 108, further movements of the slide 45 will merely cause the pawl 112 to idle, and the counter disk 100 will remain stationary because the toothed wheel 104 will not be moved. Thus, after this movement of the pawl 112 in the notch 108, film may be wound to wind up the tail strip without locking the film as occurs for each exposure.

Fig. 10 shows the operation of the counter during the film-extruding movements in which pawl 112 operates the ratchet wheel 104 as above described. In this instance, it will be noted that the pins 56 engage the inside end of the arm 55 of the slide 45 and, consequently, move it intermittently to the left with respect to this figure. Ratchet wheel 104 turns on a stud 104$^s$ carried by the mechanism plate 46. When film is to be measured and returned to spool chamber 6, the operation of the winding key 10 turns the ratchet 104 one step at a time, but in an opposite direction and through the engagement of pawl 111 and the opposite side of the ratchet teeth 107, but during this movement the operation is the same in that the ratchet wheel 104 is moved a distance equal to one tooth each time a pin 56 moves the arm 55 to move the slide 45 a sufficient distance for this action to take place. When the pawl 111 reaches the notch 108 and, consequently, when the idling position of the counter disk 100 is reached, further movement can take place to wind the film completely on the film spool shaft 11 after the last exposure has been made.

Thus, it will be seen that, with the above-described counter mechanism, provision is made for winding the leader and tail strips of the film without moving the counting disk. It should be pointed out that in both ends of the movement, the cam 109 comes into play in that the raised portion 119 moves beneath the upturned arm 120 of the lever 82 when the ratchet 104 is turned so that a pawl may idle in the cut-out 108. This prevents the stop lever 59 from dropping down into a stopping position with respect to the latching lug 58 on the slide 44 and, consequently, winding can take place without this slide being held against movement. Thus, the counter disk 101 is always synchronized properly with respect to the film movement in either direction and, when the film is being moved for exposures by being returned to the winding key shaft 11, the window 14 in the top wall 9 of the camera can be used to tell which graduation 101 or 14 is in position and, consequently, how many exposures have been made.

From the above specification and drawings, it will appear that we have provided an interlocking and counting mechanism which are well adapted to carry out the various objects of our invention, and it is obvious that structural changes may occur to those skilled in the art. We, therefore, wish it understood that the embodiments disclosed herein are by way of illustration only, and are not to be used in a limiting sense.

Having thus described our invention, what we claim is new and desire to secure by Letters Patent of the United States is:

1. A camera interlocking mechanism for controlling the relative operations of a film-winding mechanism and a shutter trigger for cameras of a roll-film type and comprising a camera body, an exposure aperture therein, spool chambers on each side of the exposure aperture, a setting type of shutter mechanism including a movable setting member, shutter members for opening and closing the shutter aperture, a lever arm having a rest and a set position, a latch for holding the shutter members in a set position, said latch being releasable by the lever arm, a trigger for releasing said latch, a film winding knob, a shaft carrying the knob, a winding knob pin movable with the shaft and knob, a slide mounted on the camera and movable by the winding knob pin through movement of the knob, a spring tending to hold the slide in an intermediate position between two extremes of movement, a protuberance on the slide for engaging and moving the shutter mechanism setting lever to set the shutter, the trigger including a flanged hub lying adjacent to the slide whereby the slide may engage the flanged hub and restrain the trigger from movement except when the slide is in a releasing position, a slide stop for holding the slide in a trigger releasing position, means for releasing the slide stop comprising a lever and pin, the pin extending into the path of the shutter mechanism lever having a rest and a set position to be moved thereby as the lever moves from a set to its rest position, and a spring moving the slide stop to release the slide when the lever moves as the shutter is released.

2. A camera interlocking mechanism for controlling the relative operations of a film-winding mechanism and a shutter trigger for cameras of a roll-film type and comprising a camera body, an exposure aperture therein, spool chambers on each side of the exposure aperture, a setting type of shutter mechanism including a movable setting member, shutter members for opening and closing the shutter exposure aperture, a lever arm having a rest and a set position, a latch for holding the shutter members in a set position, said latch being releasable by the lever arm, a trigger for releasing said latch, a film winding knob, a shaft carrying the knob, a winding knob pin movable with the shaft and knob, a slide mounted on the camera and movable by the winding knob pin through movement of the knob, a spring tending to hold the slide in an intermediate position between two extremes of movement, a protuberance on the slide for engaging and moving the shutter mechanism setting lever to set the shutter, the trigger including a flanged hub lying adjacent to the slide whereby the slide may engage the flanged hub and restrain the trigger from movement except when the slide is in a releasing position, a slide stop for holding the slide in a trigger releasing position, means for releasing the slide stop comprising a lever and pin, the pin extending into the path of the shutter mechanism lever having a rest and a set position to be moved thereby as the lever moves from a set to its rest position, and a spring moving the slide stop to release the slide when the lever moves as the shutter is released, the stop for holding the slide in a releasing position also holding the slide in an intermediate position, whereby the winding knob pin, the shaft and the winding knob may be prevented from moving in one direction.

3. A camera interlocking mechanism for controlling the relative operations of a film-winding mechanism and a shutter trigger for cameras of a roll-film type and comprising a camera body, an exposure aperture therein, spool chambers on each side of the exposure aperture, a setting type of shutter mechanism including a movable setting member, shutter members for opening and closing the exposure aperture, a lever arm having a rest and a set position, a latch for holding the shutter members in a set position, said latch being releasable by the lever arm, a trigger for releasing said latch, a film winding knob, a shaft carrying the knob, a winding knob pin movable with the shaft and knob, a slide mounted on the camera and movable by the winding knob pin through movement of the knob, a spring tending to hold the slide in an intermediate position between two extremes of movement, a protuberance on the slide for engaging and moving the shutter mechanism setting lever to set the shutter, the trigger including a flanged hub lying adjacent to the slide whereby the slide may engage the flanged hub and restrain the trigger from movement except when the slide is in a releasing position, a slide stop for holding the slide in a trigger releasing position, means for releasing the slide stop comprising a lever and pin, the pin extending into the path of the shutter mechanism lever having a rest and a set position to be moved thereby as the lever moves from a set to its rest position, and a spring moving the slide stop to release the slide when the lever moves as the shutter is released, the stop for holding the slide in a releasing position also holding the slide in an intermediate position, whereby the winding knob pin, the shaft and the winding knob may be prevented from moving in one direction, a ratchet wheel on the shaft carrying the knob, and a spring-operated pawl normally engaging the ratchet and preventing the knob from being turned in a reverse direction when said slide lies in a trigger releasing position.

4. A camera interlocking mechanism for controlling the relative operations of a film-winding mechanism and a shutter trigger for cameras of a roll-film type and comprising a camera body, an exposure aperture therein, spool chambers on each side of the exposure aperture, a setting type of shutter mechanism including a movable setting member, shutter members for opening and closing the exposure aperture, a lever arm having a rest and a set position, a latch for holding the shutter members in a set position, said latch being releasable by the lever arm, a trigger for releasing said latch, a film winding knob, a shaft carrying the knob, a winding knob pin movable with the shaft and knob, a slide mounted on the camera and movable by the winding knob pin through movement of the knob, a spring tending to hold the slide in an intermediate position between two extremes of movement, a protuberance on the slide for engaging and moving the shutter mechanism setting lever to set the shutter, the trigger including a flanged hub lying adjacent to the slide whereby the slide may engage the flanged hub and restrain the trigger from movement except when the slide is in a releasing position, a slide stop for holding the slide in a trigger releasing position, means for releasing the slide stop comprising a lever and pin, the pin extending into the path of the shutter mechanism lever having a rest and a set position to be moved thereby as the lever moves from a set to its rest position, and a spring moving the slide stop to release the slide when the lever moves as the shutter is released, a ratchet wheel having teeth, and a notch of greater width than a tooth and mounted on the camera, and a pawl for operating the ratchet wheel carried by the slide, turning the ratchet wheel step by step in one direction until said notch is reached, at which time the pawl may move idly.

5. A camera interlocking mechanism for controlling the relative operations of a film-winding mechanism and a shutter trigger for cameras of a roll-film type and comprising a camera body, an exposure aperture therein, spool chambers on each side of the exposure aperture, a setting type of shutter mechanism including a movable setting member, shutter members for opening and closing the exposure aperture, a lever arm having a rest and a set position, a latch for holding the shutter members in a set position, said latch being releasable by the lever arm, a trigger for releasing said latch, a film winding knob, a shaft carrying the knob, a winding knob pin movable with the shaft and knob, a slide mounted on the camera and movable by the winding knob pin through movement of the knob, a spring tending to hold the slide in an intermediate position between two extremes of movement, a protuberance on the slide for engaging and moving the shutter mechanism setting lever to set the shutter, the trigger including a flanged hub lying adjacent to the slide whereby the slide may engage the flanged hub and restrain the trigger from movement except when the slide is in a releasing position, a slide stop for holding the slide in a trigger releasing position, means for releasing the slide stop comprising a lever and pin, the pin extending into the path of the shutter mechanism lever having a rest and a set position to be moved thereby as the lever moves from a set to its rest position, and a spring moving the slide stop to release the slide when the lever moves as the shutter is released, a ratchet wheel having teeth, and a notch of greater width than a tooth and mounted on the camera, and a pawl for operating the ratchet wheel carried by the slide, turning the ratchet wheel step by step in one direction until said notch is reached, at which time the pawl may move idly, and a cam positioned by the ratchet wheel to hold the slide stop inoperative when the pawl lies in the notch, thereby preventing the slide from coming to rest in an exposure making position.

6. A camera interlocking mechanism for controlling the relative operations of a film-winding mechanism and a shutter trigger for cameras of a roll-film type and comprising a camera body, an exposure aperture therein, spool chambers on each side of the exposure aperture, a setting type of shutter mechanism including a movable setting member, shutter members for opening and closing the exposure aperture, a lever arm having a rest and a set position, a latch for holding the shutter members in a set position, said latch being releasable by the lever arm, a trigger for releasing said latch, a film winding knob, a shaft carrying the knob, a winding knob pin movable with the shaft and knob, a slide mounted on the camera and movable by the winding knob pin through movement of the knob, a spring tending to hold the slide in an intermediate position between two extremes of movement, a protuberance on the slide for engaging and moving the shutter mechanism setting lever to set the shutter, the trigger including a flanged hub lying adjacent to the slide whereby the slide may engage the flanged hub and restrain the trigger from movement except when the slide is in a releasing position, a slide stop for holding the slide in a trigger releasing position, means for releasing the slide stop comprising a lever and pin, the pin extending into the path of the shutter mechanism lever having a rest and a set position to be moved thereby as the lever moves from a set to its rest position, and a spring moving the slide stop to release the slide when the lever moves as the shutter is released, a ratchet wheel having teeth, and a notch of greater width than a tooth and mounted on the camera, and a pawl for operating the ratchet wheel carried by the slide, turning the ratchet wheel step by step in one direction until said notch is reached, at which time the pawl may move idly, and a cam positioned by the ratchet wheel to hold the slide stop inoperative when the pawl lies in the notch, thereby preventing the slide from coming to rest in an exposure making position, said pawl having two operative ends for engaging the ratchet wheel, the first one for moving the ratchet in one direction and the second one for moving the ratchet in a reverse direction.

7. A camera interlocking mechanism for controlling the relative operations of a film-winding mechanism and a shutter trigger for cameras of a roll-film type and comprising a camera body, an exposure aperture therein, spool chambers on each side of the exposure aperture, a setting type of shutter mechanism including a movable setting member, shutter members for opening and closing the shutter exposure aperture, a lever arm having a rest and a set position, a latch for holding the shutter members in a set position, said latch being releasable by the lever arm, a trigger for releasing said latch, a film winding knob, a shaft carrying the knob, a winding knob pin movable with the shaft and knob, a slide mounted on the camera and movable by the winding knob pin through movement of the knob, a spring tending to hold the slide in an intermediate position between two extremes of movement, a protuberance on the slide for engaging and moving the shutter mechanism setting lever to set the shutter, the trigger including a flanged hub lying adjacent to the slide whereby the slide may engage the flanged hub and restrain the trigger from movement except when the slide is in a releasing position, a slide stop for holding the slide in a trigger releasing position, means for releasing the slide stop comprising a lever and pin, the pin extending into the path of the shutter mechanism lever having a rest and a set position to be moved thereby as the lever moves from a set to its rest position, and a spring moving the slide stop to release the slide when the lever moves as the shutter is released, a ratchet wheel having teeth, and a notch of greater width than a tooth and mounted on the camera, and a pawl for operating the ratchet wheel carried by the slide, turning the ratchet wheel step by step in one direction until said notch is reached, at which time the pawl may move idly, and a cam positioned by the ratchet wheel to hold the slide stop inoperative when the pawl lies in the notch, thereby preventing the slide from coming to rest in an exposure making position, said pawl having two operative ends for engaging the ratchet wheel, the first one for moving the ratchet in one direction and the second one for moving the ratchet in a reverse direction, the direction of movement of the knob and consequently the direction of movement of the slide controlling the pawl to engage and move the ratchet wheel, the knob, shaft and winding knob pin operated thereby being engageable with an end on the slide having two sides, one side at a time being engageable with the slide.

8. The camera interlocking mechanism for controlling the relative operations of a film winding mechanism and a shutter trigger for cameras as defined in claim 7 characterized in that the slide stop holding cam is affixed to the ratchet wheel to turn therewith whereby said slide stop may be released when either of the two pawls lie in the notch of the ratchet wheel to idle therein, and whereby operation of the trigger may be prevented.

9. The camera interlocking mechanism for controlling the relative operations of a film winding mechanism and a shutter trigger for cameras as defined in claim 7 characterized in that the slide stop holding cam is affixed to the ratchet wheel to turn therewith whereby said slide stop may be released when either of the two pawls lies in the notch of the ratchet wheel to idle therein, and whereby operation of the trigger may be prevented regardless of the direction of movement of the winding knob, and means operable by movement of the winding knob in a reverse direction for engaging the pawl spaced from the notch in the ratchet wheel with a tooth of the ratchet wheel and moving it and the cam to a slide stop releasing position.

References Cited in the file of this patent

UNITED STATES PATENTS 2,028,752   Burger _____ Jan. 28, 1936

FOREIGN PATENTS 213,437   Switzerland _____ May 1, 1941